(12) United States Patent
Austin

(10) Patent No.: US 7,032,734 B2
(45) Date of Patent: Apr. 25, 2006

(54) IDLER WHEEL FOR ROTARY MILKING PLATFORMS

(75) Inventor: John Austin, Wynyard (AU)

(73) Assignee: John Austin Constructions PTY LTD, Wynyard (AU)

( * ) Notice: Subject to any disclaimer, the term of this patent is extended or adjusted under 35 U.S.C. 154(b) by 65 days.

(21) Appl. No.: 10/495,191

(22) PCT Filed: Jun. 19, 2003

(86) PCT No.: PCT/AU03/00764

§ 371 (c)(1),
(2), (4) Date: May 11, 2004

(87) PCT Pub. No.: WO04/000577

PCT Pub. Date: Dec. 31, 2003

(65) Prior Publication Data

US 2005/0015924 A1  Jan. 27, 2005

(30) Foreign Application Priority Data

Jun. 19, 2002 (AU) .................................. PS3022

(51) Int. Cl.
*B65G 37/00* (2006.01)
(52) U.S. Cl. ........................ 193/37; 193/35 R
(58) Field of Classification Search ................ 193/35, 193/37 R See application file for complete search history.

(56) References Cited

U.S. PATENT DOCUMENTS

| 4,361,930 A | | 12/1982 | Seesengood | |
|---|---|---|---|---|
| 4,379,503 A | * | 4/1983 | Kornylak | 193/37 |
| 4,664,252 A | * | 5/1987 | Galbraith | 193/37 |
| 4,802,519 A | * | 2/1989 | Moranz | 152/325 |
| 4,852,230 A | * | 8/1989 | Yu | 193/37 |
| 5,454,460 A | * | 10/1995 | Lane | 193/37 |
| 5,918,719 A | * | 7/1999 | Hino et al. | 193/37 |

FOREIGN PATENT DOCUMENTS

| DE | 34 21 188 | 12/1985 |
|---|---|---|
| DE | 41 01 530 | 7/1992 |
| GB | 2 232 389 | 12/1990 |

* cited by examiner

*Primary Examiner*—James R. Bidwell
(74) *Attorney, Agent, or Firm*—Nath & Associates PLLC; Gregory B. Kang; Derek Richmond

(57) ABSTRACT

A wheel assembly (1) for supporting and guiding a rotating milking platform the assembly (1) having a metal hub (2) with sealed bearings (3) and an outermost nylon rim (4) supported by the metal hub (2) and interlocked therewith by a spring clip (5) positioned so as to be within each of a circumferential slot (6, 7) in an outer face of the metal hub (2) and an inner face of an outermost rim (4), where the outermost rim (4) is of a material other than metal with a low coefficient of friction.

7 Claims, 6 Drawing Sheets

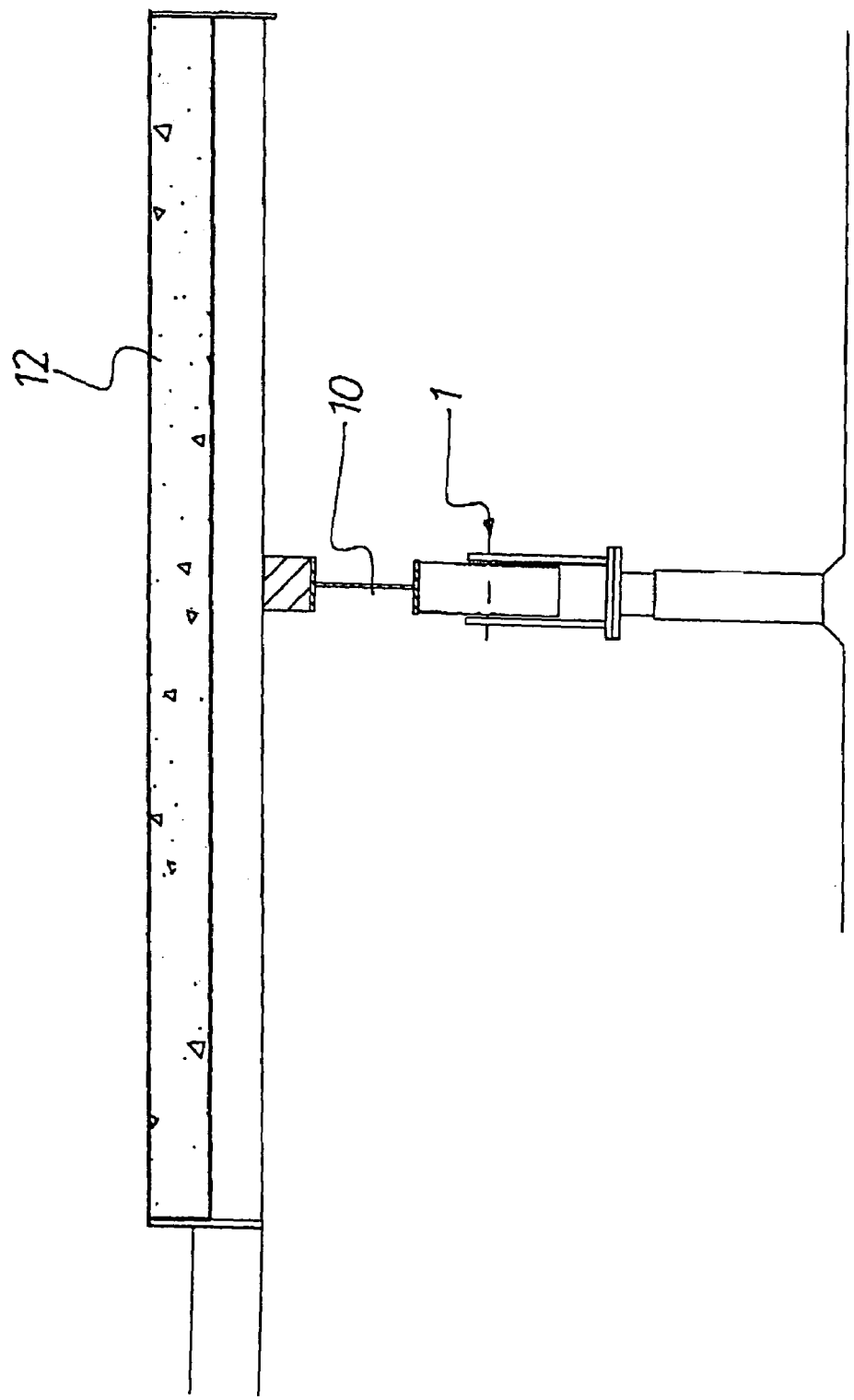

IDLER WHEEL FOR ROTARY MILKING PLATFORMS

TECHNICAL FIELD

This invention relates to milking platforms and in particular to wheels and supporting arrangements used to support and/or guide such platforms.

BACKGROUND ART

Rotating milking platforms are well known and are generally a large platform which is rotated about a vertical axis and on which cows are supported and rotated from an entry to an exit location during time that they are being milked.

A problem exists however in relation to the means by which the platform is supported. A supporting beam usually below the platform provides a circular support path toward an outer periphery of the platform. A plurality of wheels are positioned at spaced apart locations around a track and support the track for relative movement over each respective wheel with each wheel being anchored with respect to a base (the ground or some footing arrangement)

Each wheel implicitly is aligned to track in a linear direction which is to say that its axle will be aligned with a radius from a centre of rotation of the platform while the track of the beam is circular. This then means that there is a turning component in any movement of the beam as it passes over a supporting wheel. This then causes implicitly a twisting side thrust on the wheel and its support. The problem then is that this will implicitly (and does in fact) cause considerable side forces against any wheel and with this the potential to cause considerable wear.

The use of liquid lubricants to reduce wear is not tolerable in a milking shed environment where all mechanical elements will be subject to inundation for washing on a regular basis so that if oil or grease is used this can then be transferred into waterways after washing or even contaminate milk.

A difficulty then has been to have and adequately support a wheel for this purpose with a perimeter surface that will allow relative transverse rubbing across its outer perimeter with minimal wear without external lubricants and to be able to have such a surface secured in a way that will enable side thrust to be resisted while at the same time being practical for this application.

DISCLOSURE OF THE INVENTION

In one form of this invention there is proposed a wheel assembly for supporting and guiding a rotating milking platform the wheel having a metal hub with bearings, and an outermost rim supported by the metal hub and interlocked therewith by a spring clip positioned so as to be within each of a circumferential slot in an outer face of the metal hub and an inner face of an outermost rim, and where the outermost rim is of a material other than metal with a low coefficient of friction.

In preference the material is a plastics material having a low coefficient of friction.

In preference the material is a plastics material.

In a further form the invention can be said to reside in a support wheel for guiding or supporting a rotating milking platform the wheel having an inner metal hub with ball or roller bearings supported with rotational freedom by an axle, and an outermost rim encompassing the hub and being held thereto and being interlocked therewith by at the least a spring clip positioned so as to be within each of a circumferential slot in the outer face of the metal hub and an inner face of the rim, and where the outermost rim is of a material other than metal with a low coefficient of friction.

In a further form the invention can be said to reside in a wheel assembly for supporting a milking platform, the wheel having a hub, an axle passing through the hub, roller or ball bearings interspersed between the hub and the axle, a cover at each end of the hub enclosing a bearings cavity between the hub an axle and holding a viscous lubricant and sealing thereby such lubricant from egress from the cavity thereby, the hub having an outermost cylindrical surface having a circular slot in its outer cylindrical surface which is co annular with the outer surface cylindrical shape, a rim of a low friction plastics material having an innermost cylindrical surface and an outer most cylindrical surface co annular with the said innermost cylindrical surface, the inner most cylindrical surface having a circular slot there in which is co annular with the cylindrical surface, and a circular spring clip which is positioned in both respective said circular slots with a part of its thickness being in a first of the slots and a further part of its thickness being in a second of the slots to effect an interlocking engagement between the hub and rim In a further form the invention can be said to reside in a rotary milking platform having a guide rail and a plurality of support wheels being fixed to a base or the ground and being located beneath the guide rail to provide rotational support for the guide rail where at least one of said wheels has an inner metal hub with ball or roller bearings supported with rotational freedom by an axle, and an outermost rim encompassing the hub and being held thereto and being interlocked therewith by a spring clip positioned so as to be within each of a circumferential slot in the outer face of the metal hub and an inner face of the rim, and where the outermost rim is nylon.

In a further form the invention can be said to reside in a method of retaining for a wheel, a nylon outer rim with respect to an inner metal hub which includes the steps of resiliently expanding or compressing as appropriate a spring clip and in such a compressed or expanded state locating this to be aligned with a one of a circumferential slot on an inner side of the nylon rim or a circumferential slot in an outer side of the hub, then sliding the rim across the hub until the respective slots become coincident and the clip resiliently expands or compresses to then mutually interlock the rim with the hub.

In a further form the invention can be said to reside in a combination of a support wheel for guiding or supporting a rotating milking platform the wheel having an inner metal hub with ball or roller bearings adapted to be supported with rotational freedom by an axle, and an outermost rim encompassing the hub and being held thereto and being interlocked therewith by a spring clip positioned so as to be within each of a circumferential slot in the outer face of the metal hub and an inner face of the rim, and where the outermost rim is nylon.

In a further form the invention can be said to reside in a rotary milking platform installation of a type having a rotary platform supported at an outer periphery by a plurality of wheels where at least one of the wheels has an outer periphery having a rim of a material of low coefficient of friction and being secured to a metal hub by at the least a spring clip positioned so as to be within each of a circumferential slot in the outer face of the metal hub and an inner face of the rim.

In a further form the invention can be said to reside in a rotary milking platform installation of a type having a rotary platform supported at an outer periphery by a plurality of wheels where at least one of the wheels has an outer periphery having a rim of a nylon material having a low coefficient of friction and being secured to a metal hub by at the least a spring clip positioned so as to be within each of a circumferential slot in the outer face of the metal hub and an inner face of the rim.

In a further form of this invention this can be said to reside in

BRIEF DESCRIPTION OF THE DRAWINGS

For a better understanding of this invention it will now be described in relation to a preferred embodiment which shall be described with the assistance of drawings wherein:

FIG. 7 is a cross sectional view through the rotating milking platform shown in FIG. 6, taken at A—A.

BEST MODE FOR CARRYING OUT THE INVENTION

Figure 1:
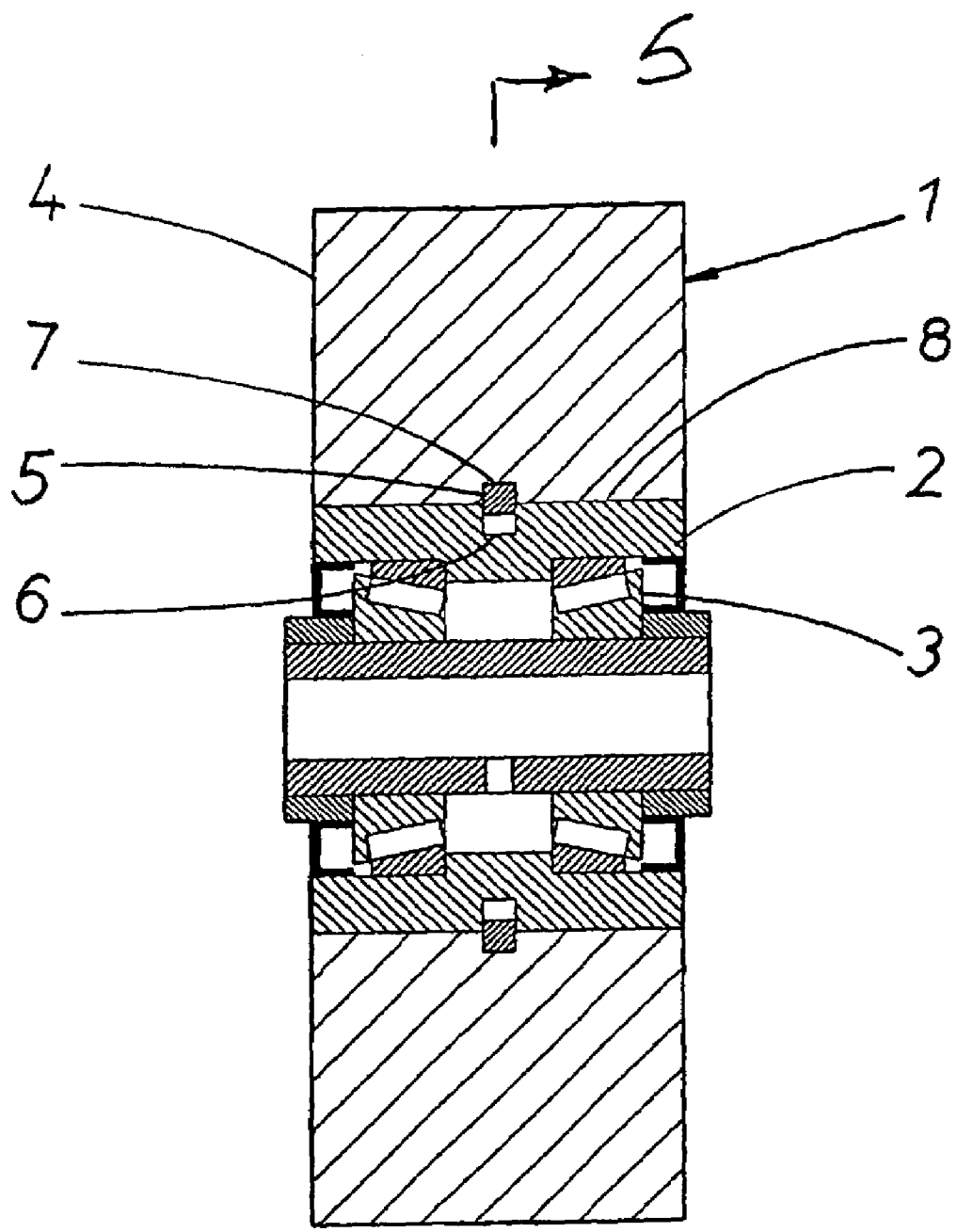
FIG. 1 is a cross sectional view through a wheel assembly constructed in accord with the embodiment.
Figure 2:
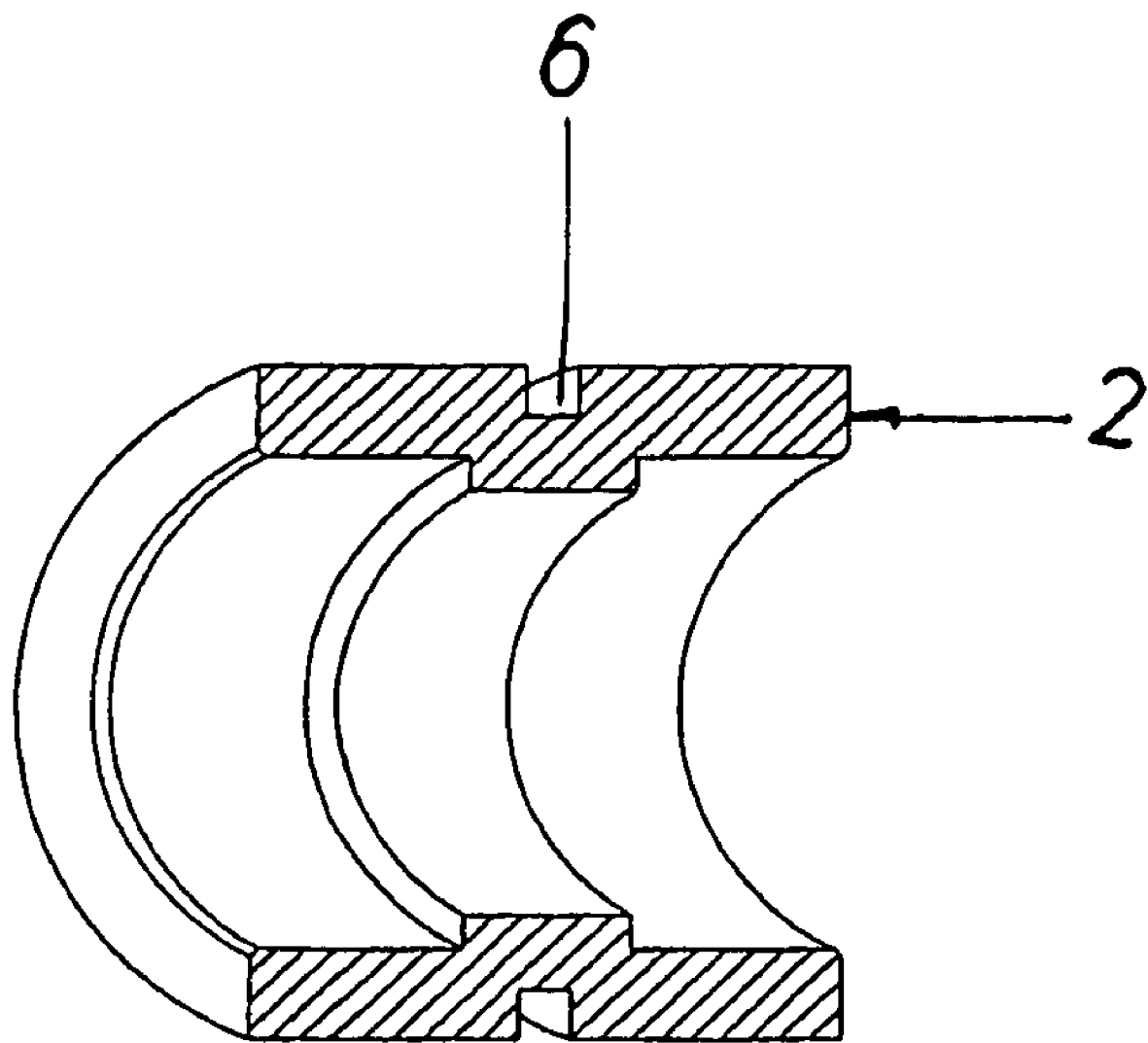
FIG. 2 is a cross sectional view of a part of the wheel shown in FIG. 1.
Figure 4:
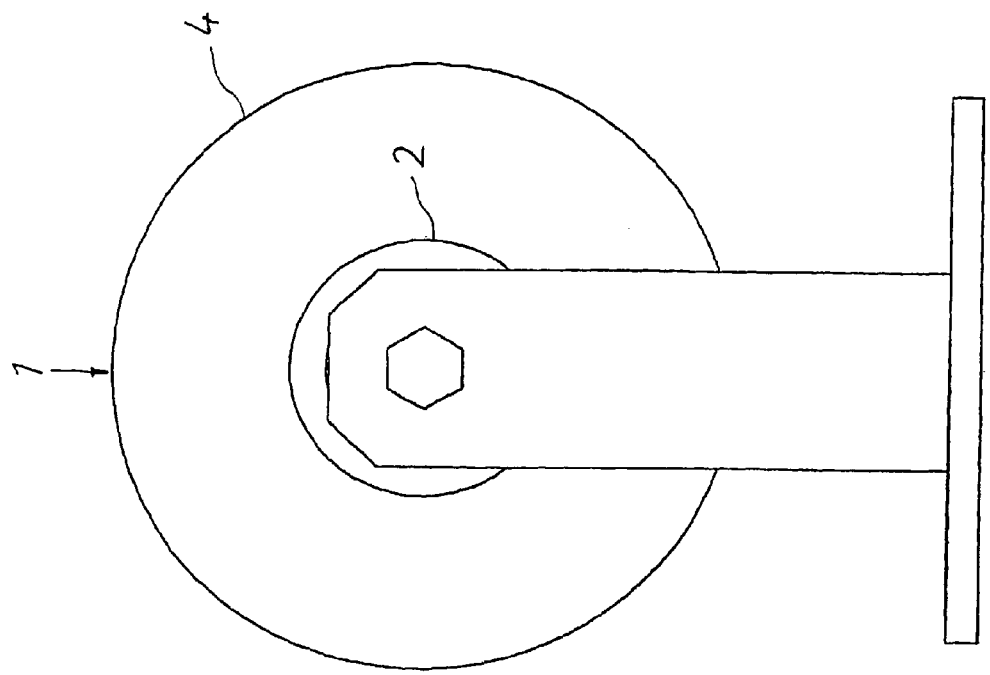
FIG. 4 is an side view of the wheel as in FIG. 3.
Figure 3:
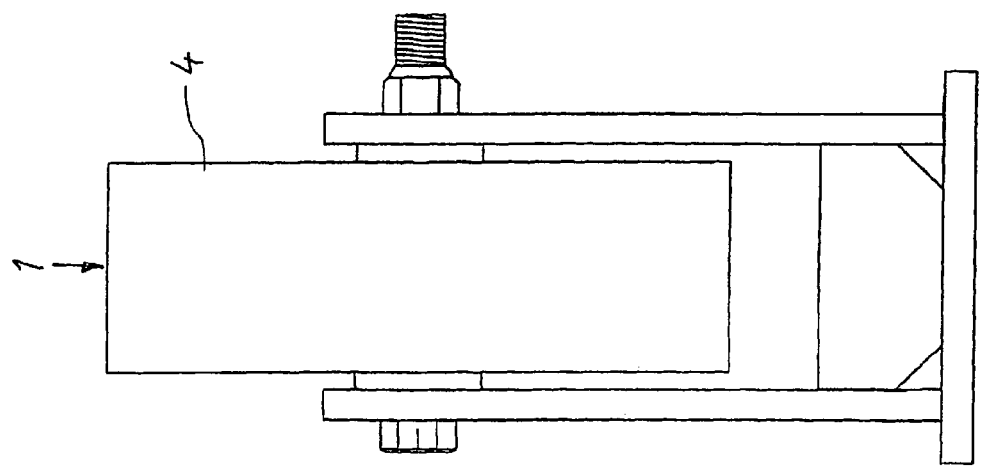
FIG. 3 is an end on view of the wheel as in FIGS. 1 and 2 with however the support which is intended to be supported and affixed to the ground.
Figure 5:
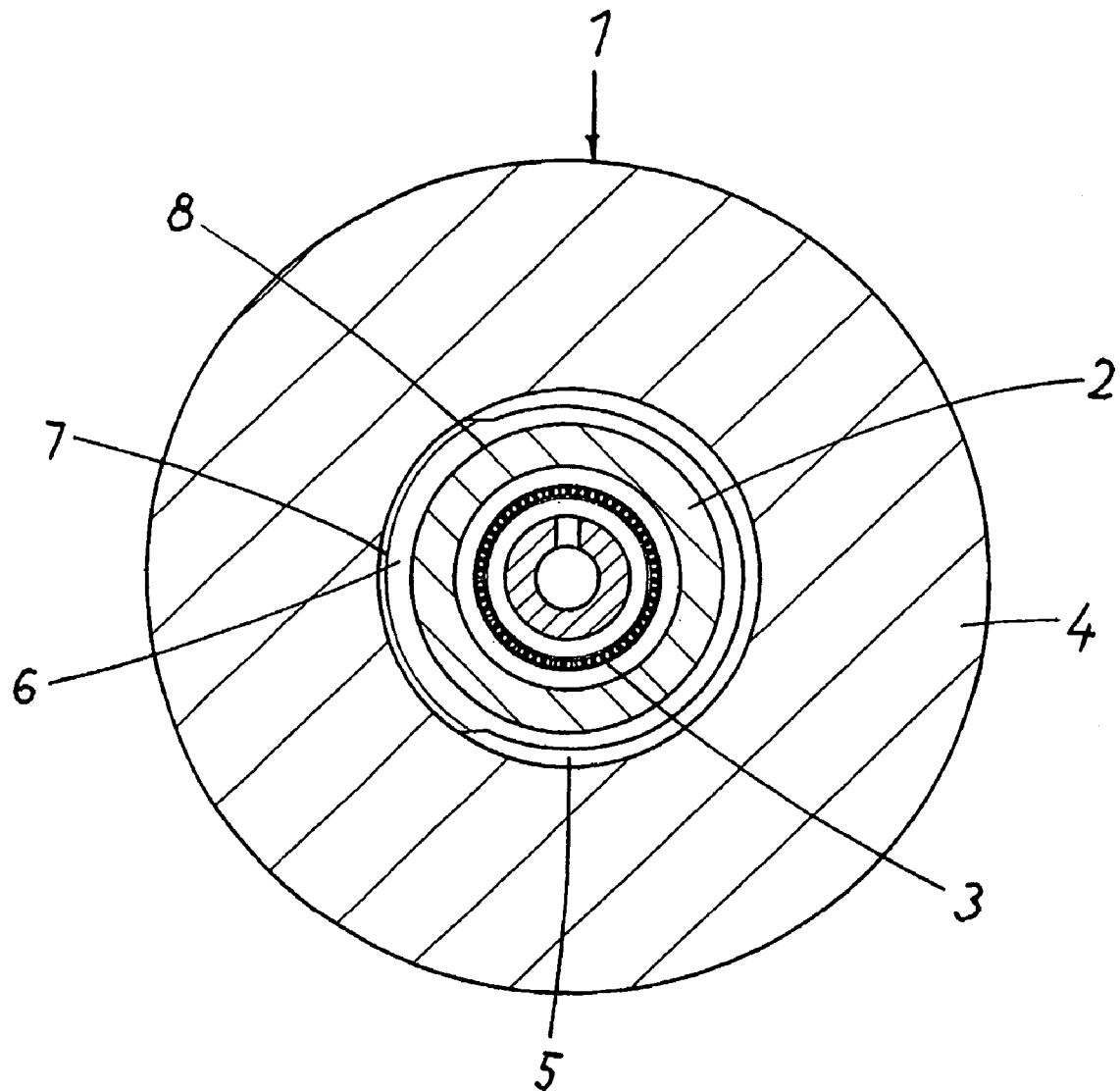
FIG. 5 is a cross sectional view along the lines 5—5 in FIG. 1.

Referring in detail to the drawings there is an idler wheel 1 for guiding and supporting a rotating milking platform the wheel 1 having a metal hub 2 with sealed bearings 3, and an outermost rim 4 supported by the metal hub 2 and interlocked therewith by a spring clip 5 positioned so as to be within each of a circumferential slot 6 and 7 in an outer face of the metal hub 2 and an inner face 8 of the rim 4 each of these faces (or surfaces) being of cylindrical shape and being of a corresponding size so that they will neatly fit one around the other with such a neat or closely nesting fit. The outermost rim 4 is comprised of nylon.

Figure 6:
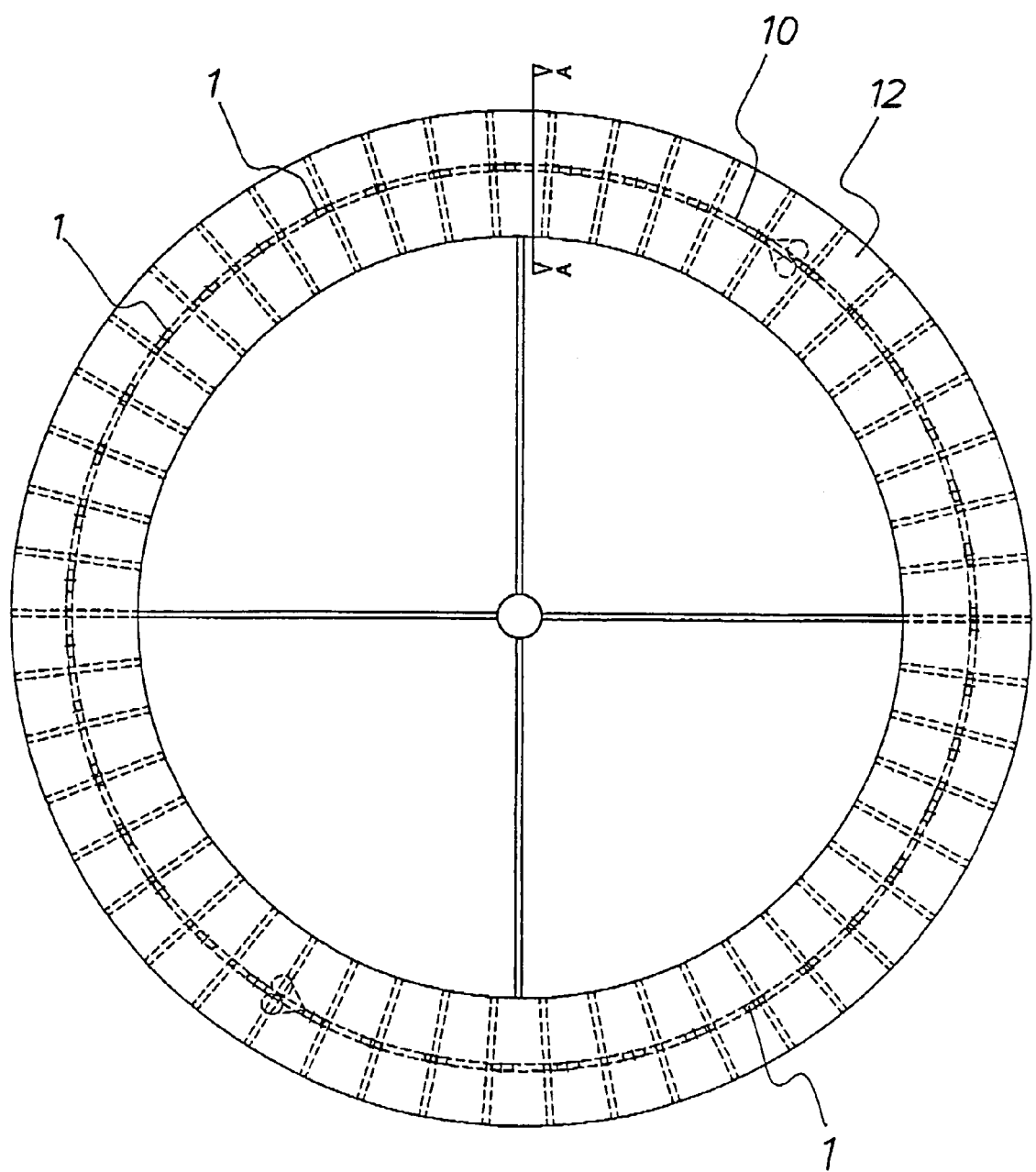
FIG. 6 is a top view of the rotating milking platform.

Referring to FIG. 6, it can be seen that the wheel 1 is one of a plurality of idler wheels that are distributed around beneath a circular support beam (net shown) which are providing the support for a circular concrete platform 12 on which cows are supported while they are being milked.

The wheels such as at 1 are, in each case, located at uniformly spaced apart locations around a periphery of a circle which is beneath an outer pathway of the said circular support beam 10.

Each of the wheels 1 is aligned so that its axis of rotation is radially aligned with respect to the circular pathway of the platform.

Such an arrangement implicitly results in practice in a side loading on the bearing surface of the rim of the support wheel 1 so that this is continually being pushed to a side which is in one direction on an approach side and in an opposite direction on a departure side.

At first sight, it might appear that any number of materials could be used to provide the contact surface by which the wheel engages against the overhead beam pathway.

In practice however there are a number of problems with respect to most materials.

Given that there is side loading (actually a twisting force which has the same result of causing a side loading) and therefore constant relative transverse friction, a conventional metal wheel would normally wear very quickly which conventionally could be answered by providing oil or grease lubrication.

Unfortunately, in the environment of a milking shed this is not an acceptable practice with the potential pollution from oil or grease or other practical lubricants.

A number of other materials can be considered but unless lubricant can be provided, all have the similar difficulty.

We have discovered that a low coefficient friction material which is not a metal will answer this problem and we have found especially that nylon which is an environmentally safe material and which is readily available provides an implicit low friction surface without the necessity of liquid lubricants.

The problem with this material however is that it is very difficult indeed to find a means by which this can be physically and strongly attached to an inner hub which inner hub is by reason of reduced friction and reasonable life necessarily a set of roller or ball bearings with sealed lubrication which will not release into the environment.

One cannot simply weld or otherwise easily physically attach the nylon rim which of course in this case is in the form of a cylinder to an inner hub or even locate capturing cheeks where the side loading would also then cause such a rim to wear and slide against such a side member.

The answer then has been, as described, to have a spring clip which is internally engaging relatively between a hub and the outer rim.

This then can be said to be the wheel 1 for supporting a milking platform 12, the wheel 1 having a hub 2, an axle passing through the hub, roller or ball bearings interspersed between the hub and the axle, a cover at each end of the hub enclosing a bearings cavity between the hub and the axle and holding a viscous lubricant and sealing thereby such lubricant from egress from the cavity thereby, the hub having an outermost cylindrical surface having a circular slot in its outer cylindrical surface which is co annular with the outer surface cylindrical shape, a rim 4 of a low friction plastics material namely nylon having an innermost cylindrical surface and an outer most cylindrical surface co annular with the said innermost cylindrical surface, the inner most cylindrical surface having a circular slot there in which is co annular with the cylindrical surface, and a circular spring clip 5 which is positioned in both respective said circular slots 6 with a part of its thickness being in a first of the slots and a further part of its thickness being in a second of the slots to effect an interlocking engagement between the hub and rim.

The method of assembly of this includes compressing the spring clip 5 in the one instance by a mechanical compressing apparatus into for instance the slot 6 located midway between its ends of the hub and then by sliding the nylon rim 4 so as to partially capture the resilient ring, release the compression from the resilient ring which will then be held against the inner surface of the rim until the rim with its inner slot is coincidentally engaging with the slot in the hub.

It is of course implicit that the slot in each case is of sufficient size in cross sectional area and depth to allow for the spring to be fully compressed or in the case of an alternative embodiment expanded to then be fully contained within a one of the slots but to thereafter expand or compress and such that the ring will engage with reasonable engagement area in relation to both the slots thereafter.

This might mean that one of the slots is deeper than the other so as to achieve this effect.

However, it will be seen also that it will be quite difficult to thereafter disassemble this construction but this is acceptable for the application and has some advantages.

By having the closely fitting rim on the hub provides a significant support with the spring clip being in practise a way of holding the two together that appears to allow for a long wear usage.

In experiments conducted so far, the invention has shown itself to provide a very significant answer to the very difficult problem that has hitherto been experienced with rotary milking platforms.

While the support wheels have been described in relation to supporting from beneath a beam 10 of the rotary platform 12, it is also possible to use a support wheel 1 in accordance with this embodiment so that they also act as outermost guide wheels 1 where for instance the rotary platform may not be supported by a central axle and is kept in a circular path simply by spaced apart idler wheels bearing against an outer edge of either the beam 10 or an outer peripheral edge of the platform 12.

The problem here in relation to offset path wear is not so difficult but the ability to provide an engaging surface which provides for a relatively low friction surface without the difficulty of potential lubricant being necessary still provides an advantage in this further application.

The invention claimed is:

1. An idler wheel for guiding a rotating milking platform, the wheel comprising a metal hub with bearings, and an outermost rim supported by the metal hub and interlocked therewith by a spring clip positioned so as to be within each of a circumferential slot in the outer face of the metal hub and an inner face of the rim, and where the outermost rim is of a material other than metal.

2. A support wheel for guiding or supporting a rotating milking platform comprising an inner metal hub with ball or roller bearings adapted to be supported with rotational freedom by an axle, and an outermost rim encompassing the hub and being held thereto and being interlocked therewith by a spring clip positioned so as to be within each of a circumferential slot in the outer face of the metal hub and an inner face of the rim, and where the outermost rim is nylon.

3. A rotating milking platform having a guide rail and a plurality of support wheels each being affixed to the ground by being supported by an axle and being located beneath the guide rail to provide rotational support therefore where at least one of said wheels has an inner metal hub with ball or roller bearings supported with rotational freedom by the respective axle, and an outermost rim encompassing the hub and being held thereto and being interlocked therewith by a spring clip positioned so as to be within each of a circumferential slot in the outer face of the metal hub and an inner face of the rim, and where the outermost rim is nylon.

4. A method of retaining a wheel, a nylon outer rim with respect to an inner metal hub which includes the steps of resilient expanding or compressing as appropriate a spring clip into one of a circumferential slot on an inner side of the nylon rim or a circumferential slot in an outer side of the hub, then sliding the rim across the hub until the respective slots become coincident and the clip resiliently expands or compresses to then mutually interlock the rim with the hub.

5. A combination of a support wheel for guiding or supporting a rotating milking platform, the wheel having an inner metal hub with ball or roller bearings adapted to be supported with rotational freedom by an axle, and an outermost rim encompassing the hub and being held thereto and being interlocked therewith by a spring clip positioned so as to be within each of a circumferential slot in the outer face of the metal hub and an inner face of the rim, and where the outermost rim is nylon.

6. A wheel for supporting a milking platform, the wheel having a hub, an axle passing through the hub, roller or ball bearings interspersed between the hub and the axle, a cover at each end of the hub enclosing a bearings cavity between the hub an axle and holding a viscous lubricant and sealing thereby such lubricant from egress from the cavity thereby, the hub having an outermost cylindrical surface having a circular slot in its outer cylindrical surface which is co-annular with the outer surface cylindrical shape, a rim of a low friction plastics material having an innermost cylindrical surface and an outer most cylindrical surface co-annular with the said innermost cylindrical surface, the inner most cylindrical surface having a circular slot there in which is co-annular with the cylindrical surface, and a circular spring clip which is positioned in both respective said circular slots with a part of its thickness being in a first of the slots and a further part of its thickness being in a second of the slots to effect an interlocking engagement between the hub and rim.

7. A milking platform having a supporting wheel as in the immediately preceding claim.

* * * * *